(12) United States Patent
Huber (10) Patent No.: US 8,783,719 B2
(45) Date of Patent: Jul. 22, 2014

(54) STEERING COLUMN FOR A MOTOR VEHICLE

(75) Inventor: Sebastian Huber, Göfis (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/119,276

(22) PCT Filed: Apr. 18, 2012

(86) PCT No.: PCT/AT2012/000106
§ 371 (c)(1),
(2), (4) Date: Nov. 21, 2013

(87) PCT Pub. No.: WO2012/162708
PCT Pub. Date: Dec. 6, 2012

(65) Prior Publication Data
US 2014/0090510 A1    Apr. 3, 2014

(30) Foreign Application Priority Data
May 27, 2011   (DE) .......................... 10 2011 050 683

(51) Int. Cl.
*B62D 1/16*      (2006.01)
*B62D 1/19*      (2006.01)
(52) U.S. Cl.
USPC ........................ 280/777; 180/444; 74/388 PS
(58) Field of Classification Search
CPC ........ B62D 5/008; B62D 5/043; B62D 5/409; B62D 1/16; B62D 1/166; B62D 1/20; B62D 1/192
USPC .............. 280/771, 777; 74/492, 493, 388 PS; 180/443, 444
See application file for complete search history.

(56) References Cited

U.S. PATENT DOCUMENTS

| 4,715,461 A | 12/1987 | Shimizu |
| 5,259,818 A * | 11/1993 | Kachi et al. ..................... 464/89 |

(Continued)

FOREIGN PATENT DOCUMENTS

| DE | 36 01 851 | 7/1986 |
| DE | 100 45 351 | 3/2002 |

(Continued)

OTHER PUBLICATIONS

International Search Report (ISR) issued Nov. 22, 2012 in International (PCT) Application No. PCT/AT2012/000106.
German Office Action (OA) issued Jan. 13, 2012 in German priority Application No. 10 2011 50 683.7.

*Primary Examiner* — Ruth Ilan
(74) *Attorney, Agent, or Firm* — Wenderoth, Lind & Ponack, L.L.P.

(57) ABSTRACT

A steering column for a motor vehicle has a rotatably mounted steering spindle and a motor-powered steering assistance device for steer angle superposition and/or torque assistance. The steering assistance device is connected to the steering spindle by at least one transmission element, and the steering spindle has at least two steering spindle parts connected to one another in torque-transmitting fashion. The steering spindle parts connected to one another in at the steering spindle between the transmission element and a steering wheel connection of the steering spindle, by at least one damping body for damping vibrations transmitted via the steering spindle. At least one of the steering spindle parts is rotatably mounted in a casing unit of the steering column. In the damping body, there is formed a cavity into which the casing unit can slide preferably in the event of a crash-induced deformation and/or displacement within the steering column.

13 Claims, 4 Drawing Sheets

(56) References Cited

U.S. PATENT DOCUMENTS

| | | | |
|---|---|---|---|
| 5,816,615 A * | 10/1998 | Dupont et al. | 280/780 |
| 2002/0142850 A1* | 10/2002 | Garcia et al. | 464/180 |
| 2006/0116209 A1* | 6/2006 | Sadakata et al. | 464/84 |
| 2007/0259721 A1* | 11/2007 | Scrimpsher et al. | 464/89 |
| 2011/0247891 A1* | 10/2011 | Meyer et al. | 180/443 |

FOREIGN PATENT DOCUMENTS

| | | |
|---|---|---|
| DE | 10 2010 006 069 | 9/2010 |
| EP | 1 260 725 | 11/2002 |
| EP | 2 177 420 | 4/2010 |
| GB | 2 170 157 | 7/1986 |
| WO | 2010/109232 | 9/2010 |

* cited by examiner

STEERING COLUMN FOR A MOTOR VEHICLE

BACKGROUND OF THE INVENTION

The present invention relates to a steering column for a motor vehicle, with a rotatably supported steering spindle and a motor-driven power steering or steering assist device for steering angle superposition and/or torque support. The steering assist device by at least one transmission element is connected with the steering spindle, and the steering spindle comprises at least two torque-transmitting steering spindle parts connected with one another. The steering wheel mounting adapter of the steering spindle are connected with one another by at least one damping body for damping vibrations transferred via the steering spindle.

In general, linguistic usage steering columns with motor-driven steering assist devices are frequently referred to as servo steering. On the one hand, the steering assist devices can execute a steering angle superposition, or, expressed differently, they can increase or decrease a steering angle entered manually into the steering spindle via the steering wheel. However, motor-driven steering assist devices can also serve for torque support. In this context, it is also spoken of as steering force booster. With these pure steering assist devices, the realized steering angle introduced into the steering spindle is not changed, but the motor-driven steering assist device exerts a corresponding additional torque such that the driver only needs to exert low steering forces or torques when steering the motor vehicle. Within the prior art there are also known motor-driven steering assist devices which perform a steering angle superposition as well as also a torque support.

Steering columns with relevant motor-driven steering assist devices are disclosed, for example, in WO 2010/109232 A1 and EP 2 177 420 A1. The latter European publication teaches prestressing Teflon inserts by elastomer bodies such that no rattling noise can be generated in a transmission component.

However, in the prior art, vibrations are frequently generated by the auxiliary force or assistance motor of the motor-driven steering assist device. These vibrations are transferred via the steering spindle onto the steering wheel. To avoid this transfer of these vibrations onto the steering wheel, DE 36 01 851 C2 discloses a generic solution within the prior art.

SUMMARY OF THE INVENTION

The present invention addresses the problem of proposing an improvement that enables (in generic steering columns) a telescope-like pushing together of the steering column.

This problem is resolved according to the invention through a steering column as described below.

Consequently, the invention provides that at least one of the steering spindle parts is rotatably supported in a jacket unit of the steering column and that in the damping body a hollow volume is formed into which the jacket unit can preferably slide upon a crash-caused deformation and/or a dislocation within the steering column.

In the region between the transmission element and the steering wheel mounting adapter of the steering spindle, a damping body is integrated into the steering spindle. This body dampens the vibrations and noises generated by the auxiliary force motor of the motor-driven steering assist device in such manner that they are not, or are at least not to a perceptible extent, transferred via the steering spindle into the interior of the passenger compartment of the motor vehicle.

A method for operating a steering spindle according to the invention can provide that, in a region of the steering spindle between the transmission element and a steering wheel mounting adapter of the steering spindle, vibrations transferred via the steering spindle are damped by the damping body.

To exclude vibrations from being conducted around the damping body through physical connections, preferred embodiments of the invention provide that the steering spindle parts, at least in normal operation of the steering column, are exclusively connected with one another via the damping body, preferably such that they transmit torque. This means that, apart from their connection via the damping body, the steering spindle parts are connected, at least during normal operation, free of additional transference means for vibrations.

Feasible damping bodies are in particular elastomers. It can herein be provided that the entire damping body is comprised of one or several elastomers. However, it can also be provided for the damping body to include at least one elastomer.

It is preferably provided that the damping body, in addition to its vibration-damping properties, also serves for the torque transmission between the steering spindle parts. Consequently, it is in this context advantageous for the damping body, at least during normal operation, to be connected, on the one hand, torque-transmittingly with one of the steering spindle parts and, on the other hand, be torque-transmittingly connected with another of the steering spindle parts. A corresponding connection between the damping body and the particular steering spindle part can be realized through adhesion, vulcanization and/or other types of connection such as, for example, riveting or bolting. Favorable is in this context if the damping body is implemented with respect to the adjacently implemented regions of the steering column such that it is radially expansive. This permits the transmission of relatively high torques via the damping body. Connections under form closure are also suitable for the transmission of torque.

Preferred embodiments of the invention provide for the steering spindle parts to be disposed with their rotational axes, about which they are rotatable, coaxially with respect to one another at least in their regions bordering the damping body.

Reference is made in this connection to the fact that different steering spindle parts can also be connected with one another by a universal joint, as is known per se in prior art. For example, a corresponding universal joint can be provided in the steering spindle between the motor-driven steering assist device and the steering wheel mounting adapter of the steering spindle. However, other variants are also feasible in which a corresponding universal joint is integrated into the steering spindle in the region between the motor-driven steering assist device and a steering gearing acting onto the steering linkage, thus, viewed in the normal driving direction of the motor vehicle, in front of the motor-driven steering assist device.

General reference is made to the fact that steering columns according to the invention can be implemented such that they are nonadjustable as well as also adjustable in the direction of height and/or of length. It is also feasible for energy absorption devices, known in the prior art for absorbing energy in the event of a crash, to be integrated into the steering column. In this context, the steering spindle can thus be implemented not only of two steering spindle parts between which the damping body is disposed but also of yet additional steering spindle parts. Thus, it is feasible for individual steering spindle parts to be disposed such that they are also telescopable one into the other.

Especially preferred embodiments of steering columns according to the invention provide for the telescope-like implementation, for example for the event of a crash, that at least one of the steering spindle parts, preferably both steering spindle parts, comprise a pot-like connection flange, wherein the damping body is preferably secured in each instance on the pot-like connection flange(s). The hollow volume, further mentioned above into which the jacket unit can be slid or can immerse, in this case can be, for example, a corresponding hollow volume in at least one of the connection flanges implemented in the form of a pot. Especially preferred embodiments of the invention provide that the steering spindle parts connected with one another by damping bodies comprise each a pot-like connection flange, and the damping body is disposed between the pot-like connection flanges preferably between cylindrical jacket-shaped sections of the pot-like flanges. These variants subsequently favorably provide that one of the pot-like connection flanges, is preferably, at least sectionally, disposed coaxially within the other pot-like connection flange.

In particular, in the case of such pot-like connection flanges, it is advantageous for the damping body to be implemented as a circumferential self-contained cylindrical jacket wall.

For the sake of completeness, reference is made to the fact that by "pot-like connection flange" is to be understood, in particular, such a connection flange in which a bottom surface of the connection flange is encased by a jacket surface of the connection flange, and the bottom surface and jacket surface together delimit a hollow volume in the connection flange that is open toward one side. The bottom surface does herein not necessarily have to be level or continuous; and the bottom surface can also comprise recesses or cutouts. The jacket surface can also, but does not necessarily have to, be implemented in the shape of a cylindrical jacket.

For the sake of completeness, reference is made to the fact that by "motor-driven steering assist device", as is also known in prior art, a device is understood that is provided with at least one auxiliary force (prime mover) motor. This device can be provided for the steering angle superposition in that, with the aid of the auxiliary force motor, it changes a rotational angle introduced via the steering wheel onto the steering spindle, such that this steering angle is transmitted in a changed manner onto the steering gearing and therewith onto the wheels of the motor vehicle. The motor-driven steering assist device can equally well also be provided with an additional torque for the purpose of supporting the steering movement of the vehicle driver such that, for the purpose of steering the driver, only needs to introduce lower forces into the steering wheel. In the course of the invention, moreover, there can also be involved motor-driven steering assist devices which perform a steering angle superposition as well as also a torque support. The motor-driven steering assist devices of this type are known per se and therefore do not need to be separately described here once again. Reference will only be made to the fact that the auxiliary force motors can be electrical as well as also hydraulic or pneumatic or other motors known in prior art.

The steering spindle is frequently also referred to in practice as steering shaft. It is that rotatably supported part of the steering column at one side point of which on the steering wheel mounting adapter of the steering spindle the steering wheel or another steering handle is secured and which, on the other side point, is connected to the steering gearing which transmits the rotational movement of the steering spindle onto the steering linkage and therewith onto the wheels of the motor vehicle. The steering spindle, which, as a rule, is a multipart structure, is most frequently guided through the steering assist device wherein the auxiliary force motor of the steering assist device acts via a transmission element known per se, such as for example a toothed wheel or the like, onto the steering spindle. The transmission element is thus the connecting element of the steering assist device for the connection with the steering spindle or for acting onto the steering spindle.

For the sake of completeness, reference is also made to the fact that the damping body in its preferred implementation can be realized as a single part, for example, as already mentioned above, having the form of a cylindrical jacket or tube. However, it is equally well feasible for the steering spindle parts in the manner according to the invention for damping vibrations to be connected with one another not via a single damping body, but rather via several damping bodies. Stated differently, the damping body can also be a multipart damping body.

BRIEF DESCRIPTION OF THE INVENTION

Further features and details of preferred embodiments of the invention will be described in conjunction with the description of the figures, in which.

Like elements or those having the same effect are denoted in the Figures by the same reference numbers.

DETAILED DESCRIPTION OF THE INVENTION

Figure 1:
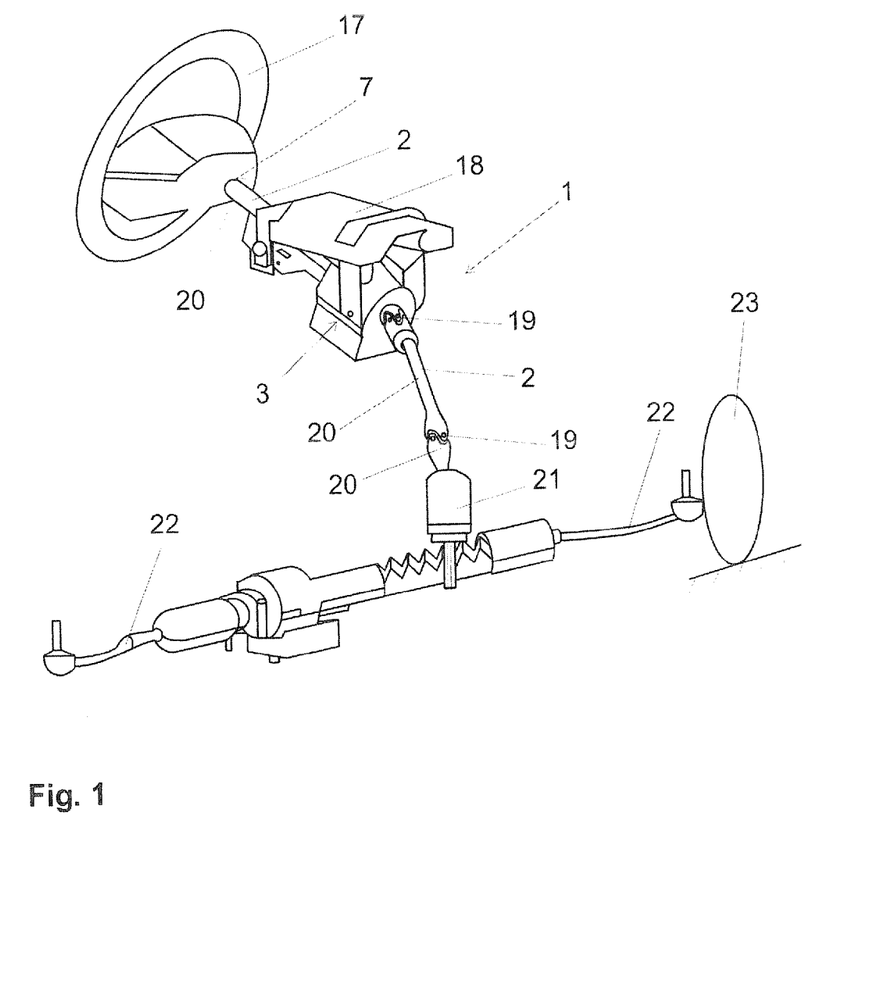
FIG. 1 is a schematic depiction to explain the general structure of a steering column.

FIG. 1, first, depicts a schematic example of a steering column 1, whose fundamental structure is known per se, with a rotatably supported multipart steering spindle 2. The steering spindle 2 serves for the transmission onto the steering gearing 21 of the steering movements executed by the driver of the motor vehicle on the steering wheel 17. By means of the steering gearing 21, the rotational movement of the steering spindle 2 is converted into a movement of the steering linkage 22 whereby the wheel 23—only one is shown here in highly schematic form—of the motor vehicle carries out a steering angle. FIG. 1 shows several steering spindle parts 20 of the steering spindle 2. One of the steering spindle parts 20 comprises the steering wheel mounting adapter 7 on which the steering wheel 17 is secured. The steering spindle parts 20 disposed between the motor-driven steering assist device 3 and the steering gearing 21 are connected with one another by universal joints 19. The steering spindle parts 5 and 6 essential to the invention, which are each disposed on damping body 8, are not visible in the highly schematic depiction according to FIG. 1 and neither is the jacket unit 11 in which the steering spindle 2 is rotatably supported. These structural components are obscured in FIG. 1 by a bracket unit 18. The latter serves for securing the steering column 1 to the chassis of the motor vehicle. In terms of the capability of adaptation of the position of the steering wheel 17 to the particular driver, the jacket unit 11 bearing the steering spindle 2 can be displaceable relative to the jacket unit 18 in the longitudinal direction of the steering spindle 2 and/or in the vertical direction. The displacement and clamping mechanisms necessary for this purpose are known per se in prior art and can be utilized in steering columns 1 according to the invention. Also known are the motor-driven steering assist devices 3 here depicted only schematically in FIG. 1. As already explained, they can also serve in steering columns implemented according to the invention for steering angle superposition and/or for torque support. In implementing the invention, motor-driven steering assist devices 3, thus those steering assist devices provided with auxiliary force motors, can be employed such that these also do not need to be discussed further. For the sake of completeness, reference is made to the fact that the entire rotatably supported multipart shaft structure, guided from the steering wheel mounting adapter 7 up to the steering gearing 21, is denoted as steering spindle 2. In the depicted embodiments, the steering spindle 2 is carried through the steering assist device 3. A transmission element 4 of the steering assist device 3, not visible in FIG. 1, acts onto the steering spindle part 6 carried through the steering assist device 3 and in this manner transmits the steering angle superposition generated by the steering assist device 3, and/or the torque support, onto the steering spindle part 6 and therewith onto the steering spindle 2. This will be explained in detail further down in conjunction with the examples depicted in FIGS. 2 to 7. However, for the present, it is pointed out that the universal joints 19 do not need to be located exclusively between the steering assist device 3 and the steering gearing 21. Embodiments of the invention are also conceivable in which the steering spindle 2 comprises one or several universal joints 19 in the region between steering assist device 3 and steering wheel mounting adapter 7.

Figures 2, 3:
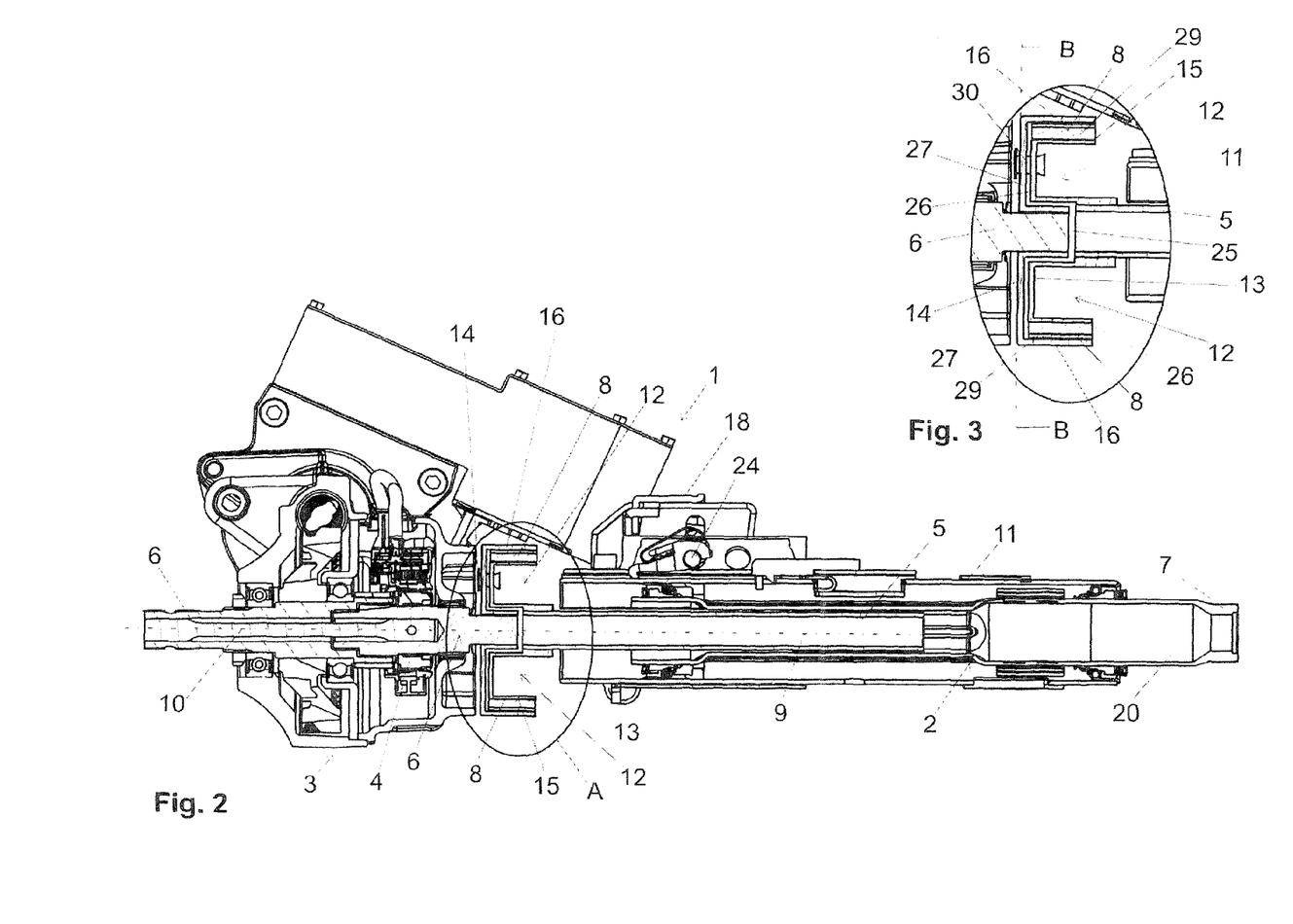
FIG. 2 is a longitudinal section through a steering column according to the invention in a first embodiment.
FIG. 3 shows the enlarged region A from FIG. 2.

FIG. 2 depicts a longitudinal section of a first embodiment of a steering column 1 according to the invention in the region between steering wheel mounting adapter 7 and steering assist device 3. The sections, not shown here, of the steering column 1 between steering assist device 3 and steering gearing 21 are not essential to the invention and can be omitted in the detail depiction according to FIGS. 2 and 6. With respect to these omitted parts, reference is made to prior art and in particular to FIG. 1.

In the longitudinal section according to FIG. 2, three parts of steering spindle 2 can be seen. These are, first, the steering spindle part 20 comprising the steering wheel mounting adapter 7. The steering spindle part 20 is telescopably connected with the steering spindle part 5 in a manner known per se. Through this telescope-like connection of said two steering spindle parts 5 and 20, the steering spindle 2 in the event of a crash can be compressed in its length along the rotational axis 9 of the steering spindle part 5 such that, in the event of a crash, the steering wheel 17 does not encroach too far into the passenger compartment. In the region of said steering spindle parts 5 and 20, the steering spindle 2 is supported in the jacket unit 11 rotatably about the rotational axis 9. The jacket unit 11, as stated, is secured, preferably displaceably, via a clamping and/or displacement mechanism, not further shown here, on the bracket unit 18. Between jacket unit 11 and bracket unit 18 an energy absorption device 24, here only depicted schematically, can be provided. Such energy absorption devices 24 are known in prior art and do not need to be explained further. They serve for the controlled energy absorption in the event of a crash when the jacket unit 11 is shifted in the direction toward the steering assist device 3 due to the impact of the motor vehicle driver onto the steering wheel 17.

As already explained in the introduction, the invention, as those shown in the Figures, provides that the jacket unit 11, with this crash-caused dislocation movement and/or also with a longitudinal adjustment of the steering column 1, can be immersed or slid into a hollow volume 12 implemented in the damping body 8, as will be explained in detail further down. Hereby, a relatively large displacement path for the jacket unit 11 can be made available without a large overall length of the entire steering column 1 resulting herefrom.

With the interconnection of the damping body 8, which will be explained in detail later, the steering spindle part 5 implemented here as a hollow shaft is adjoined by the steering spindle part 6 carried through the steering assist device 3. The steering assist device 3 can be implemented as is known in prior art. It acts via the transmission element 4 onto the steering spindle part 6 in a manner known per se in order to execute the steering angle superposition and/or the torque support. As the power unit for the steering assist device 3, the latter comprises an auxiliary force motor. This can be an electric, hydraulic, pneumatic or other prime mover motor. All of these motors have in common that they entail the risk that during their operation vibrations are transferred via the transmission element 4 onto the steering spindle 2 and therewith onto the steering wheel 17. It is imperative that they be avoided as has been explained in the introduction. To this end, in the region of the steering spindle 2 between the transmission element 4 and the steering wheel mounting adapter 7 of steering spindle 2, the steering spindle parts 5 and 6 are connected with one another by means of at least one damping body 8 for damping vibrations transferred via the steering spindle 2. Before the type of connection realized in the embodiment example according to FIGS. 2 to 5, in the transition region between the steering spindle parts 5 and 6 in the transition region, is explained in conjunction with the enlarged detail A in FIG. 3, reference is made to the fact that in the depicted embodiment examples the steering spindle parts 5 and 6, connected with one another across the damping body 8 such that they transmit torque, are, with respect to one another, disposed coaxially with respect to their rotational axes 9 and 10 about which they are rotatably supported.

As can be seen especially well in the enlarged depiction according to FIG. 3, on the steering spindle part 5 is fixed a pot-like connection flange 13. On the steering spindle part 6 is likewise fixed a pot-like connection flange 14. Each of these connection flanges 13 and 14 comprises bottom surfaces 26 and 27 each of which support cylindrical jacket-shaped sections 15 and 16 of the connection flanges 13 and 14. The connection flanges 13 and 14 implemented in the form of pots are connected one within the other in the manner depicted and, apart from the damping body 8, are, at least in normal operation, not in direct physical contact with one another. It is hereby attained that the steering spindle parts 5 and 6 during normal operation of the steering column 1 are exclusively connected with one another across the damping body 8. In the depicted embodiment, the damping body 8 is also the sole path for the torque transmission between the steering spindle parts 5 and 6. Apart from the damping body 8, the connection flanges 13 and 14, and therewith also the steering spindle parts 5 and 6, are separated from one another across the clearance 25.

Figure 5:
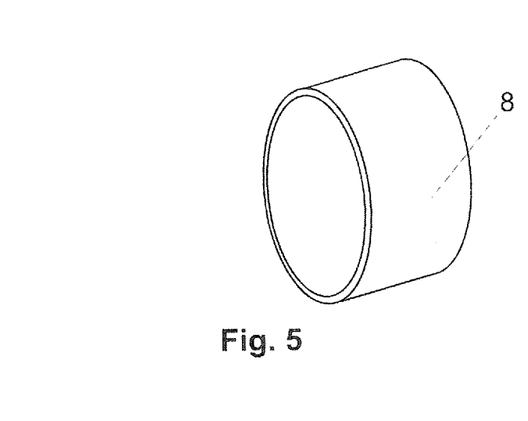
FIG. 5 is a schematic depiction of a damping body.

As can be seen especially well in FIG. 5, in the depicted variants the damping body 8 is implemented as a circumferential self-contained cylindrical jacket wall. With its cylindrical jacket-shaped outer surface, the damping body 8 is secured such that it transmits torque on the cylindrical jacket-shaped section 16 of the connection flange 14 and therewith on the steering spindle part 6. Via its cylindrical jacket-shaped inner surface, the damping body 8 is connected torque-transmittingly with the cylindrical jacket-shaped section 15 of the connection flange 13 and therewith with the steering spindle part 5. As indicated in the depicted embodiment, between the damping body 8 and the particular portion connected therewith of the steering spindle parts 5 and 6, there can still be disposed intermediate layers 29. These can be adhesion promoters, sheet metal sleeves, adhesion layers and the like. The intermediate layers 29 can be disposed between damping body 8 and the particular adjoining structural component of the steering spindle part 5 as well as also between damping body 8 and the particular adjoining structural component of steering spindle part 6. For the vibration damping the damping body 8 advantageously includes at least one elastomer. The damping body 8 can also be comprised entirely of elastomer. Other materials suitable for vibration damping can also be provided as the damping body 8 or in the damping body 8. For the securement of the damping body 8 on the corresponding structural components of the steering spindle parts 5 and 6 adhesion connections, on-vulcanization or simple pressing-in or other suitable connection known per se in prior art can be provided. It is in any case advantageous for the damping body 8 to project beyond the adjacent regions of the steering spindle parts 5 and 6 in the radial direction with respect to the rotational axes 9 and 10 since in this case relatively large torques can be transmitted. However, as stated, apart from the torque transmission, the damping body 8 serves mainly for damping vibrations generated by the auxiliary force motor of the steering assist device 3. It prevents these vibrations from being transferred onto the steering spindle part 5 and therewith in the direction toward the steering wheel mounting adapter 7. It is conceivable and feasible for the jacket-shaped sections 15 and 16 of the connection flanges 13 or 14 not to be cylindrical but rather circumferentially polygonal, circumferentially wave-shaped, with the forms corresponding with respect to one another and to the damping body 8. It becomes possible in this manner to transmit a high torque reliably without having to rely for the torque transmission on the connection strength between damping body 8 and jacket-shaped section 15 and section 16.

Figure 8:
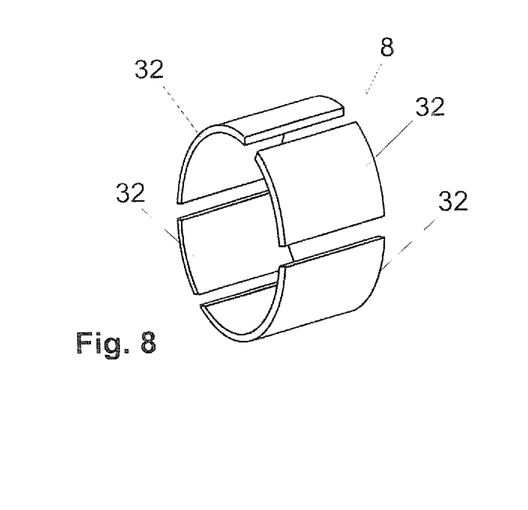
FIG. 8 shows an alternative implementation of the damping body.

In an alternative embodiment, the damping body 8 can also be formed of multiple parts and, in particular in the circumferential direction, by several individual damping elements 32, such as is depicted in FIG. 8. The damping body 8 can also comprise recesses and/or holes continuous through it.

In addition to the structural components already described, in the depicted embodiments, a stop pin 30 is provided. This is a pure safety element which ensures that in the event the connection between damping body 8 and/or its connection to the steering spindle parts 5 and 6 fails, emergency operation of the steering of the motor vehicle is nevertheless possible. In normal operation, the stop pin 30 has no function and also does not represent a transference bridge for vibrations. It is only employed if torques between the steering spindle parts 5 and 6 occur that lead to a break or another failure of the connection of steering spindle parts 5 and 6 via the damping body 8.

Figure 4:
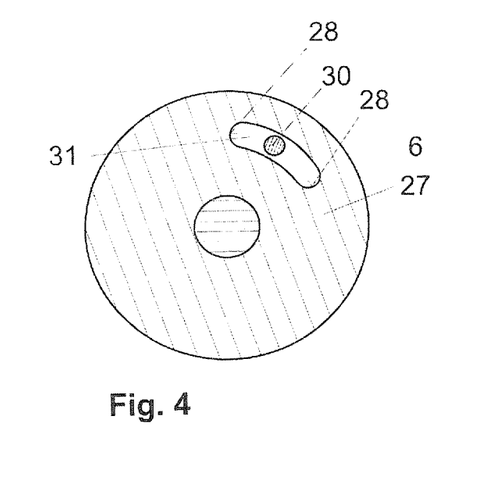
FIG. 4 is a section depiction of the sectional plane BB from FIG. 3.

FIG. 4 depicts a section along the sectional plane B-B through the bottom surface 27 of connection flange 14 of the steering spindle part 6. It can be seen in this section that this bottom surface 27 comprises an arc-shaped elongated hole 31 delimited by two stops 28. The stop pin 30 secured on the bottom surface 26 of the connection flange 13 of steering spindle part 5 is carried through the elongated hole 31. However, it is not in direct contact at any site with the bottom surface 27, and therewith with the steering spindle part 6, during normal operation depicted in FIG. 4. In this way, it is avoided that during normal operation, vibrations can be transferred from the steering spindle part 6 across the stop pin 30 onto the steering spindle part 5.

Only if the torque transmission via the damping body 8 fails and the steering spindle part 5, and therewith the stop pin 30, is turned out of position relative to the steering spindle part 6 does an abutment of the stop pin 30 on one of stops 28 occur starting at a rotational angle predetermined by means of the length of the elongated hole 31, whereby the emergency operation of the steering is ensured in the event the torque transmission via the damping body 8 fails. The stop pin 30 can be implemented of a metal or a suitable synthetic material. It can be provided with vibration damping sheathing or be comprised of such a material. To avoid any vibration transference during normal operation, however, the clearances depicted in FIG. 4 between stop pin 30 and the side walls delimiting the elongated hole 31 of the bottom surface 27 can be adequate. In particular, when a stop pin 30 sheathed with an elastomer or formed of elastomer is utilized, under certain conditions a physical contact between the stop pin 30 and the margins of the elongated hole 31 can be acceptable. It is also feasible for the pin itself to be secured in the bottom surface 26 of the connection flange 13, in which the stop pin does not engage into the arc-shaped elongated hole 31, using an elastomeric reception or vibration-damping reception. It is understood that this emergency function detected by the stop pin 30 can also be realized differently. It is, for example, conceivable to provide the elongated hole 31 in the bottom surface 26 of the connection flange 13 attached on the steering spindle part 5 and to fix the stop pin 30 on the bottom surface 27 of the connection flange 14 of steering spindle part 6.

It is also conceivable and feasible to form in the bottom surface of one of the connection flanges a deep impression or also an interspersion which represents the relevant function as stop pin 30.

Figures 6, 7:
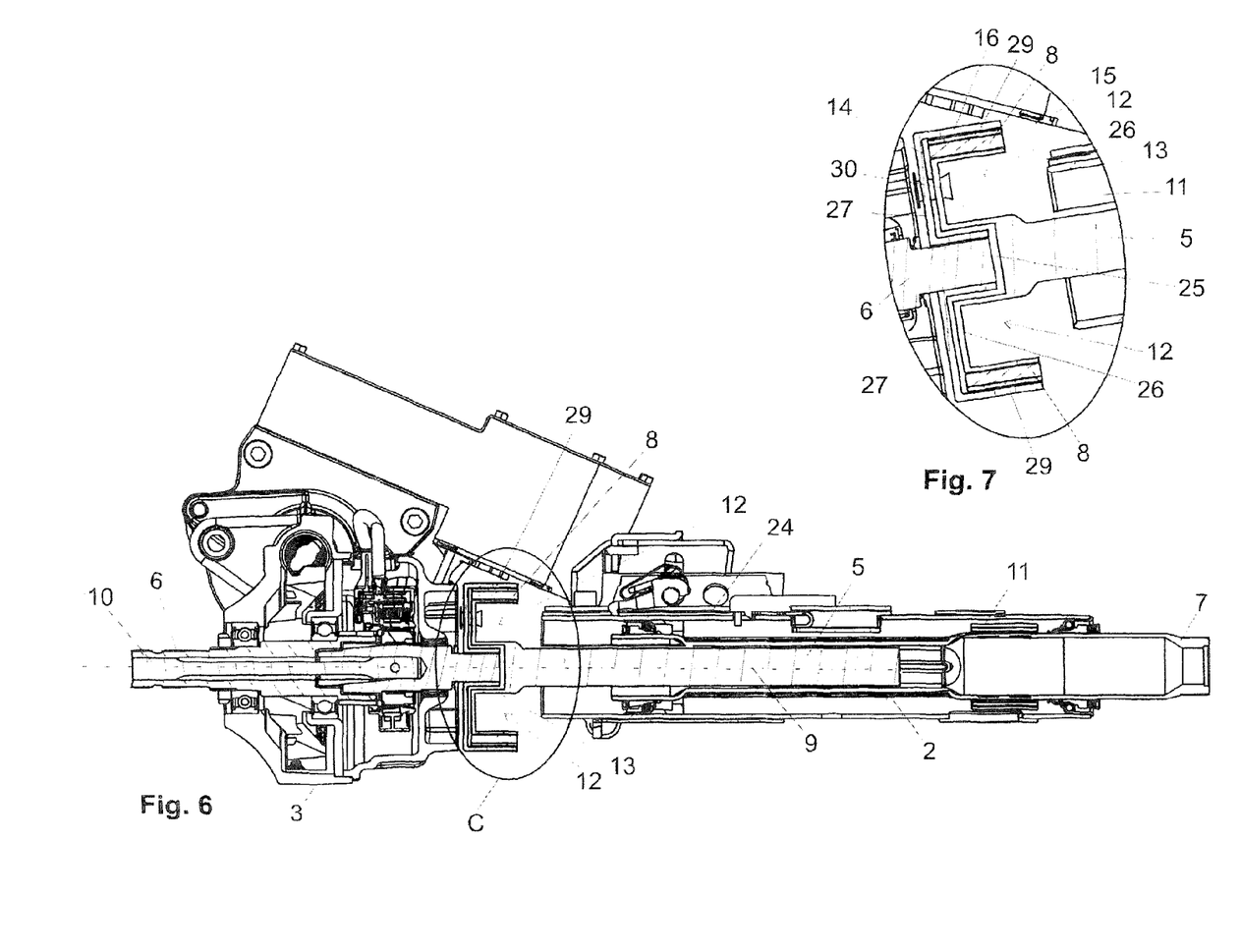
FIG. 6 is a longitudinal section analogous to FIG. 2 through a second embodiment of the invention.
FIG. 7 shows the enlarged depiction of detail C from FIG. 6.

FIGS. 6 and 7 show a second embodiment according to the invention, largely identical to the first embodiment example according to FIGS. 2 to 5. Consequently, here only the differences will be discussed. These comprise essentially that in the second embodiment, the steering spindle part 5 is not implemented as a hollow shaft but rather as a solid rod. Moreover, in this second embodiment, the connection flange 13 is implemented as an integral part on the steering spindle part 5, while in the first embodiment according to FIGS. 2 to 5 the connection flange 13 is initially a separate part that is subsequently fixed on the steering spindle part 5.

To the extent it is technically feasible, different features of the embodiments described above can also be combined with one another and interchanged without leaving the scope of the invention.

LEGEND TO THE REFERENCE NUMBERS

1 Steering column
2 Steering spindle
3 Steering assist device
4 Transmission element
5 Steering spindle part
6 Steering spindle part
7 Steering wheel mounting adapter
8 Damping body
9 Rotational axis
10 Rotational axis
11 Jacket unit 12 Hollow volume
13 Connection flange
14 Connection flange
15 Cylindrical jacket-shaped section
16 Cylindrical jacket-shaped section
17 Steering wheel
18 Bracket unit
19 Universal joint
20 Further steering spindle parts
21 Steering gearing
22 Steering linkage
23 Wheel
24 Energy absorption device
25 Clearance
26 Bottom surface
27 Bottom surface
28 Stop
29 Intermediate layer
30 Stop pin
31 Elongated hole
32 Damping element

The invention claimed is:

1. A steering column for a motor vehicle, said steering column comprising:
 a rotatably supported steering spindle having a steering wheel mounting adapter; and
 a motor-driven steering assist device for steering angle superposition, torque support, or steering angle superposition and torque support;
 wherein the steering assist device is connected with the steering spindle by a transmission element, and the steering spindle comprises at least two steering spindle parts connected with one another such that the at least two steering spindle parts transmit torque,
 wherein the steering spindle parts, in a region of the steering spindle between the transmission element and the steering wheel mounting adapter of the steering spindle, are connected with one another by a damping body for damping vibrations transferred via the steering spindle,
 wherein at least one of the at least two steering spindle parts is rotatably supported in a jacket unit of the steering column, and in the damping body, a hollow volume is formed into which the jacket unit is slidable.

2. The steering column as in claim 1, wherein, at least during normal operation of the steering column, the steering spindle parts are exclusively connected with each other via the damping body.

3. The steering column as in claim 2, wherein the steering spindle parts are exclusively connected via the damping body such that they are torque transmitting.

4. The steering column as in claim 1, wherein, at least during normal operation of the steering column, the damping body is connected, on the one hand, with one of the steering spindle parts such that it transmits torque and, on the other hand, is connected with another of the steering spindle parts such that it transmits torque.

5. The steering column as in claim 1, wherein the steering spindle parts, at least in their regions bordering on the damping body with respect to one another, are disposed coaxially with their rotational axes about which they are rotatable.

6. The steering column as in claim 1, wherein the damping body includes at least one elastomer or consists of at least one elastomer.

7. The steering column as in claim 1, wherein the damping body is implemented as a circumferential self-contained cylindrical jacket wall.

8. The steering column as in claim 1, wherein at least one of the steering spindle parts comprises connection flange.

9. The steering column as in claim 8, wherein the damping body is preferably secured on the pot-like connection flange.

10. The steering column as in claim 1, wherein the steering spindle parts, are connected with one another by the damping body and each of the steering spindle parts comprises pot-like connection flange, and the damping body is disposed between the pot-like connection flanges.

11. The steering column as in claim 10, wherein the damping body is disposed between cylindrical jacket-shaped sections of the pot-like connection flanges.

12. The steering column as in claim 1, wherein the jacket unit is slidable into the hollow volume in the event of a deformation, a shift within the steering column, or a crash and a shift within the steering column due to a crash.

13. The steering column as in claim 1, wherein both of the at least two steering spindle parts comprise a connection flange implemented in the form of a pot, the damping body being secured in each case on the pot-like connection flanges.

* * * * *